US010029620B1

(12) United States Patent
Huebner et al.

(10) Patent No.: US 10,029,620 B1
(45) Date of Patent: Jul. 24, 2018

(54) HIDDEN STORAGE COMPARTMENT WITHIN CENTER CONSOLE

(71) Applicant: Ford Global Technologies, LLC, Dearborn, MI (US)

(72) Inventors: Annette Lynn Huebner, White Lake, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/415,365

(22) Filed: Jan. 25, 2017

(51) Int. Cl.
*B60R 7/04* (2006.01)
*B60N 3/10* (2006.01)

(52) U.S. Cl.
CPC ............... *B60R 7/04* (2013.01); *B60N 3/103* (2013.01)

(58) Field of Classification Search
CPC .................................. B60R 7/04; B60N 3/103
USPC .............................................. 296/24.34, 37.8
See application file for complete search history.

(56) References Cited

U.S. PATENT DOCUMENTS

| 4,040,549 | A | 8/1977 | Sadler | |
|---|---|---|---|---|
| 7,490,886 | B1 | 2/2009 | Walke | |
| 7,806,451 | B2 | 10/2010 | Lota | |
| 8,540,300 | B1 * | 9/2013 | Merkel | B60N 3/12 296/37.12 |
| 2004/0135391 | A1 * | 7/2004 | Gehring | B60N 3/102 296/37.12 |
| 2007/0182183 | A1 * | 8/2007 | Lota | B60R 7/04 296/24.34 |
| 2009/0115215 | A1 * | 5/2009 | Abro | B60R 7/04 296/24.34 |
| 2009/0315356 | A1 * | 12/2009 | Stueber | B60N 3/106 296/24.34 |
| 2011/0095556 | A1 * | 4/2011 | Werner | B60N 3/105 296/24.34 |
| 2013/0057012 | A1 * | 3/2013 | Blackmore | B60K 37/04 296/37.13 |
| 2015/0197201 | A1 * | 7/2015 | Greiner | B60R 7/04 296/24.34 |
| 2015/0375685 | A1 | 12/2015 | Krishnan et al. | |
| 2016/0101718 | A1 * | 4/2016 | Bohlke | B60N 3/106 296/37.8 |

* cited by examiner

*Primary Examiner* — Jason S Morrow
(74) *Attorney, Agent, or Firm* — Vichit Chea; Brooks Kushman P.C.

(57) ABSTRACT

A vehicle includes a console disposed between driver and passenger seats and adjacent an instrument panel. The console defines a storage area. The vehicle also includes a first compartment disposed within the storage area. The first compartment includes a slot defined on a surface of the first compartment. The vehicle further includes a second compartment disposed within the storage area, and vertically offset and adjacent to the first compartment. A first channel, accessible via the slot, interconnects the first and second compartments such that the slot feeds a receptacle defined within the second compartment.

15 Claims, 2 Drawing Sheets

HIDDEN STORAGE COMPARTMENT WITHIN CENTER CONSOLE

TECHNICAL FIELD

This disclosure relates to a storage compartment used for smaller items, such as coins within a center console of a vehicle.

BACKGROUND

Vehicles use storage compartments that allow drivers and passengers to comfortably and accessibly store items that may be required for travel. One such storage compartment may be a console disposed between a driver seat and a passenger seat within a cabin of the vehicle. The console may be referred to as a center console. The center console may include various features such as cup holders as well as a larger storage compartment defined adjacent to the cup holders. The larger storage compartment may be adapted such that it is divided into various parts, each being configured to organize various items typically used for travel within a vehicle. Various inserts, each having differing organizational and storage capacities, may be disposed within and configured to be removed from the larger storage compartment to divide the storage compartment.

SUMMARY

A center console for a vehicle includes a first compartment including a first receptacle and a first channel. The first receptacle and the first channel are accessible via a slot defined in a surface of the first compartment. The center console for the vehicle further includes a second compartment having a second receptacle. The second receptacle is disposed vertically offset and aligned with the first receptacle. The first channel interconnects the slot and the second receptacle.

A vehicle includes a console disposed between driver and passenger seats and adjacent an instrument panel. The console defines a storage area. The vehicle also includes a first compartment disposed within the storage area. The first compartment includes a slot defined on a surface of the first compartment. The vehicle further includes a second compartment disposed within the storage area, and vertically offset and adjacent to the first compartment. A first channel, accessible via the slot, interconnects the first and second compartments such that the slot feeds a receptacle defined within the second compartment.

A storage arrangement for a center console of a vehicle includes a first compartment having a surface defining more than one slot. Each of the slots have an associated channel. The storage arrangement also includes a second compartment disposed vertically offset and aligned with the first compartment. The second compartment defines a plurality of second receptacles. Each of the associated channels is configured to feed one of the plurality of second receptacles.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
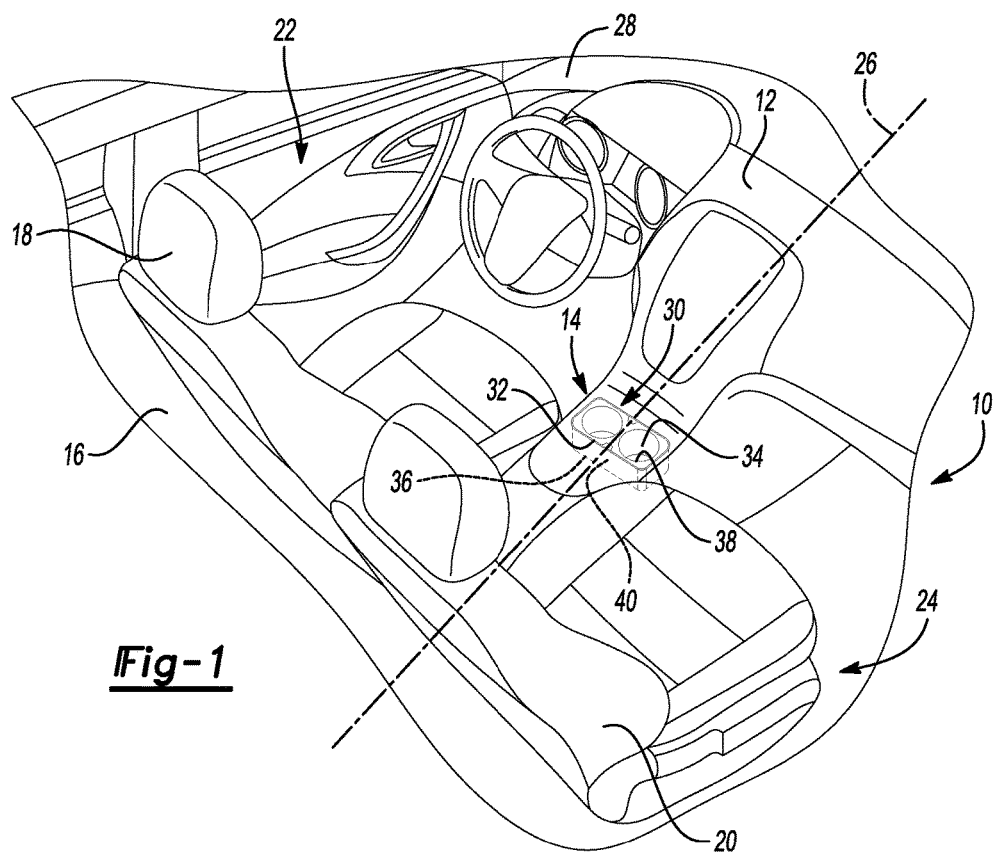
FIG. 1 is a perspective view of a vehicle having a center console with a storage compartment.

Referring to FIG. 1, a perspective view of a vehicle 10 is depicted. The vehicle 10 includes an instrument panel 12 and a console 14 disposed adjacent to the instrument panel 10 and extending in a direction toward a rear 16 of the vehicle 10. The console 14 may also be disposed between a driver seat 18 and a passenger seat 20. In this instance, the driver seat 18 is associated with a driver side 22 of the vehicle 10 and the passenger seat 20 is associated with a passenger side 24 of the vehicle 10. Because the console 14 is disposed immediately adjacent the instrument panel 12 and between the driver seat 18 and the passenger seat 20, the console 14 may be referred to as a center console 14, being located in substantially a center 26 of a front 28 of the vehicle 10. This allows the console 14 to be assessable by either a driver (not shown) or a passenger (not shown).

The console 14 includes a storage compartment 30, which defines a storage area 32. The storage compartment 30 and specifically the storage area 32 may be configured to store items required for travel, such as roadmaps coins for tolls, or any other incidental item that may be required during vehicle travel. Further, the storage compartment 30 may be a cupholder to provide convenient access to fluids during travel. Storing items within the storage area 32 such as coins and cups simultaneously, may be unsightly and cause grime to form within the storage compartment 30. Further, items such as coins may be strewn within the storage area 32 of the storage compartment 30 without organization. The lack of organization within the storage area 32 of the storage compartment 30 may contribute to an unsightly appearance of the storage compartment 30 and, therefore, a console 14 having a storage compartment 30 with an organized storage area 32 may be advantageous.

The console 14 may, therefore, include a way to organize items stored within the storage compartment 30 such that the storage area 32 is sightly. For example, the storage compartment 30 may be configured to separate items of different types, such as between cups and coins, within the storage area 32. Separating items of different type within the storage area 32 allows the storage compartment 30 to more adequately store and make assessable those items, which are frequently used during travel. As will be described in more detail below, the storage compartment 30 may be divided into more than one storage compartment 30. For example, the storage compartment 30 may include a first compartment 34 used to store cups, such that a first receptacle 38 of the first compartment 34 is configured to hold cups. Likewise, the storage compartment 30 may include a second compartment 36 used to store coins, such that a second receptacle 40 of the second compartment 36 specifically stores and organizes coins.

Figure 2:
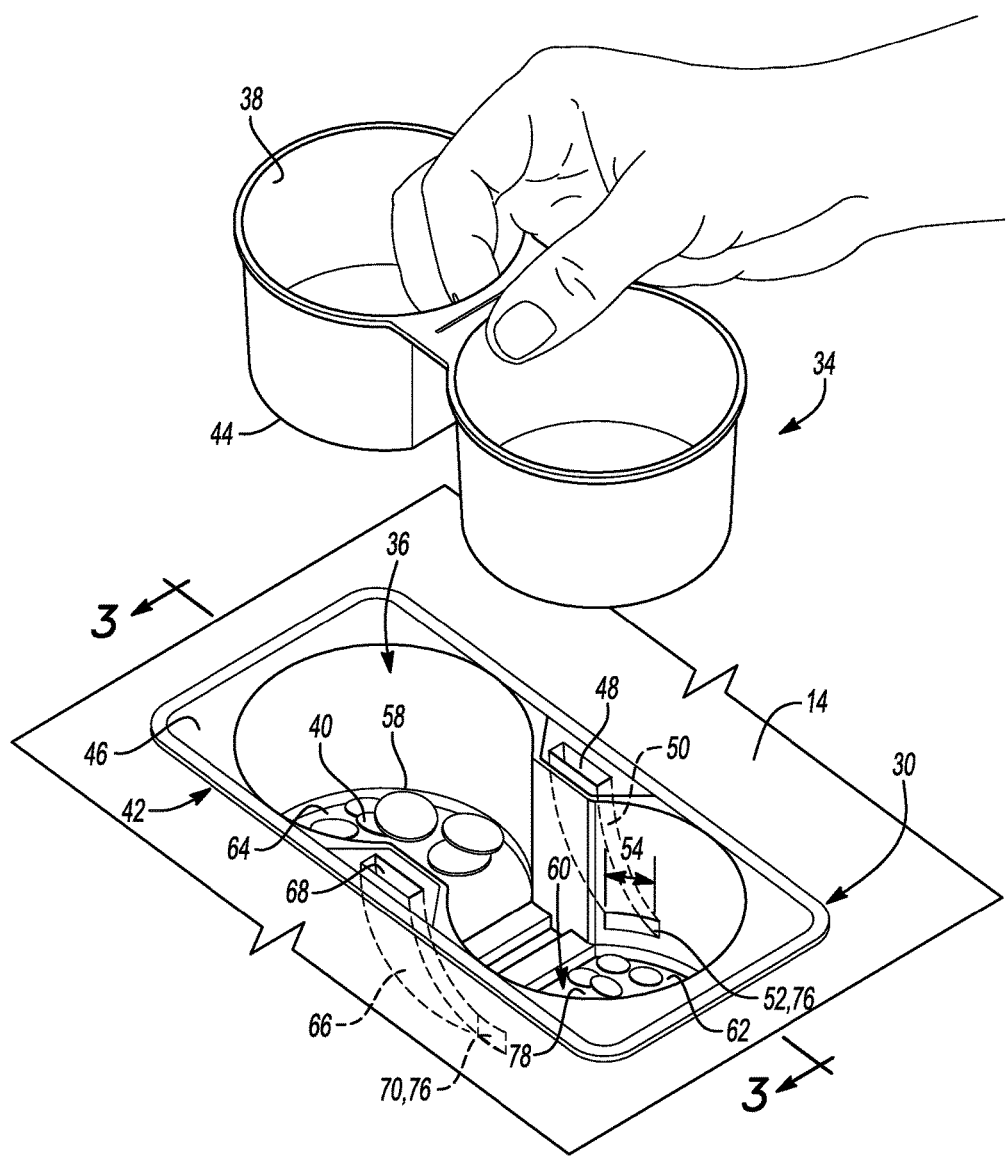
FIG. 2 is an exploded perspective view of a storage arrangement for the storage compartment of the center console.

FIG. 2 depicts an exploded perspective view of a storage arrangement 42 for the storage compartment 30 of the center console 14. The storage arrangement includes the first and second storage compartments 34, 36 and the first and second receptacles 38, 40. As can be seen in FIG. 2, the second storage compartment 36 is disposed vertically offset from a bottom surface 44 of the first storage compartment 34. The first storage compartment 34 may also include a first surface 46 disposed opposite of the bottom surface 44 when the first receptacle 38 is disposed within the first compartment 34. The first surface 46 of the first storage compartment 34 defines a slot 48. A channel 50 interconnects the slot 48 and the second receptacle 40 of the second storage compartment 36. Therefore, the second storage compartment 36, via the slot 48, is assessable from the first surface 46 of the first storage compartment 34. Being assessable from the first surface 46 allows the storage arrangement 42 to organize items between the first storage compartment 34 and the second storage compartment 36.

Specifically, the second storage compartment 36 is assessable from the first surface 46 of the first storage compartment 34 through the slot 48 and down the channel 50. For example, the slot 48 may be sized to receive a variety of coins such that the coins slide down the channel 50 and into the second receptacle 40 of the second storage compartment 36. Therefore, the slot 48 feeds the second receptacle 40 of the second storage compartment 36 from the first surface 46 of the first storage compartment 34. Also, the second storage compartment 36 may further include an outlet 52. The outlet 52 is disposed opposite the slot 48 such that the channel 50 interconnects the slot 48 and the outlet 52. Specifically, the slot 48 feeds the second receptacle 40 from the first surface 46 of the first storage compartment 34 through the channel 50 and out of the outlet 52. When a coin is inserted into the slot 48, it slides down the channel 50, exits the channel 50 through the outlet 52, and is disposed in the second receptacle 40 of the second storage compartment 36. As will be described in more detail below, the slot 48, the channel 50, and the outlet 52 may define a width 54 based on varying diameters of coins.

The second receptacle 40 may define a section 56 along an outer perimeter 58 of the second receptacle 40 for receiving the coins. The section 56 may be divided into a plurality of portions 60. The plurality of portions 60 includes at least first and second portions 62, 64. The plurality of portions 60 divide the section 56 of the second receptacle such that the coins slide down the channel 50 and exit the outlet 52 into either the first 62 or second portion 64. For example, if the outlet 52 empties the coins from the channel 50 into the first portion 62 of the section 56, the second portion 64 may be used for other storage, such as by way of example, dollar bills. Likewise, if the outlet 52 empties the coins from the channel 50 into the second portion 64 of the section 56, the first portion 62 may be used for other storage, such as by way of example, vehicle registration cards. Dividing the section into portions allows the second storage compartment 36 to be configured to conceal certain items. In at least one other embodiment, the plurality of portions 60 may be further subdivided into more than the first or second portions 62, 64 depending on the optimal dimensions of the second compartment 36 to store items typically used during travel.

In a further embodiment, the storage arrangement 42 may further include a second channel 66. Similar to the first channel 50, the second channel 66 may interconnect a second slot 68, defined on the first surface 46 of the first compartment 34, and a second outlet 70, which empties into the second receptacle 40 of the second compartment 36. Therefore, the second outlet 70 may empty the coins into either the first or second portions 62, 64. For example, if the second outlet 70 empties the coins into the first portion 62, the first outlet 52 may empty additional coins into the second portion 64, or vice versa. In this way, the storage arrangement 42 may be configured to separate or add coins to the second receptacle. As stated above, the outlet 52 may define a width 54 based on coin diameters. The second outlet 70 may also define a width 72 based on coin diameters. For example, the width 54 of the first outlet 52 may be sized to receive quarters such that the first portion 62 of the section 56 of the second receptacle 40 holds only quarters. In a similar manner, the width 72 of the second outlet 52 may be sized to receive dimes such that the second portion 64 of the section 56 of the second receptacle 40 holds only dimes. This allows the storage arrangement 42 to organize coins based on size.

In still a further embodiment, the storage compartment 42 may further include a plurality of outlets 74, each outlet 76 of the plurality of outlets 74 may be associated with a single portion 78 of the plurality of portions 60, including the first and second portions 62, 64. Additionally, each outlet 76 of the plurality of outlets 74 may be connected to the first channel 50 such that the first slot 48 is configured to receive coins of all size. For example, the first slot 48 may be sized to receive any coins, the first channel 50 may be sized to allow all coins to the slide to the plurality of outlets 74. Each outlet 76 of the plurality of outlets 74 may define a width 78 different from each of the adjacent widths 80. In this way, a single coin may be associated with a specific outlet 76 in the plurality of outlets 74 to fill a specific portion 78 of the plurality of portions 60. Using the previous example, the first channel may feed the plurality of outlets 74, and the first outlet 52 may only empty quarters into the first portion 62 and the second outlet 70 may only empty dimes into the second portion 64. While described with the first channel 50, the second channel 66 may also be used in addition to, or separately from the first channel 50 and in this way, the second slot 68 feeds the second channel 66 as described above.

Figure 3:
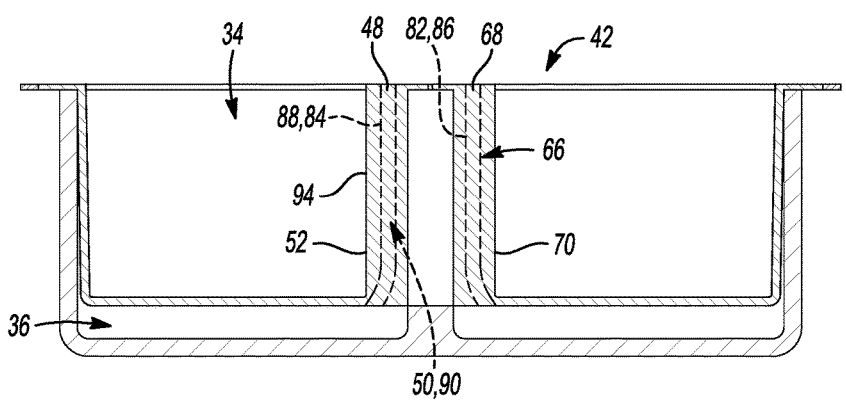
FIG. 3 is a cross-sectional view of the storage arrangement taken along lines 2-2 of FIG. 2.

Referring to FIG. 3, a cross-sectional view of the storage arrangement 42 taken along the lines 2-2 of FIG. 2 is shown. Specifically, the orientation of the first compartment 34 relative to the second compartment 36 is depicted. As previously described, each outlet 76 of the plurality of outlets 74 may define a width 78 different from each of the adjacent widths 80. In a similar manner, each outlet 76, including the first outlet 52 and the second outlet 70, of the plurality of outlets 74 may define a predetermined contour 82.

The predetermined contour 82 may be based on the form and shape of individual coins. Each of the first outlet 52 and the second outlet 70 may have a different predetermined contour 82. For example, the first outlet 52 may use a predetermined contour 82 based on the shape and form of a quarter and the second outlet 70 may use a predetermined contour 82 based on the shape and form of a nickel. In a similar manner, the first slot 48 and the second slot 68 as well as the first channel 50 and the second channel 66 may also all define a predetermined contour 82 based on the shape and form of coins. Therefore, the first outlet 52, the first channel 50 and the first slot 48 may define a first predetermined contour 84 and the second outlet 70, the second channel 66 and the second slot 68 may define a second predetermined contour 86. The first predetermined contour 84 may be different from the second predetermined contour 86. Using the previous example, the first predetermined contour may be formed from a quarter and the second predetermined contour 86 may be formed from a nickel.

Expanding this example, each outlet 76 of the plurality of outlets 74 may define an individual predetermined contour 88, wherein each individual predetermined contour 88 is different. For example, each individual contour 88 of each outlet 76 of the plurality of outlets 74 is formed and is shaped based on different coins, such as an individual predetermined contour 88 for each of quarters, nickels, dimes and pennies, for example. The predetermined contour 82, including the first predetermined contour 84, the second predetermined contour 86 and each individual predetermined contour 88 allows the storage arrangement 42 to sort the coins more efficiently. This allows the storage arrangement 42 to separate and organize coins of varying size and diameter within the second receptacle 40 of the second compartment 36. Storing and organizing coins underneath the first compartment 34 conceals the coins within the second compartment 36, which may discourage theft.

The storage arrangement 42 may be formed as a single piece. In at least one other embodiment, the storage arrangement 42 may be formed integrally. Therefore, each channel 90 associated with each of the individual predetermined contours 88 may be disposed adjacent to each of the other individual predetermined contour 88 across a wall 94 of the second compartment 36. In at least one other embodiment, the channels 90 may be disposed on opposite sides of the second compartment 36.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A center console for a vehicle comprising:
    a first compartment including a first receptacle and a first channel accessible via a slot defined in a surface of the first compartment;
    a second compartment having a second receptacle disposed vertically offset and aligned with the first receptacle, and defines a section along an outer perimeter of the second receptacle, wherein the first channel interconnects the slot and the second receptacle the section being divided into a plurality of portions including at least a first portion and a second portion; and
    a second channel accessible via a second slot defined on the surface of the first compartment, wherein the second channel interconnects the second slot and the second portion and the first channel interconnects the slot and the first portion of the section.

2. The center consoled of claim 1, wherein the first channel has a predetermined contour, and the second channel has a predetermined contour.

3. A vehicle comprising:
    a console disposed between driver and passenger seats and adjacent an instrument panel, the console defining a storage area;
    a first compartment disposed within the storage area and including a slot defined on a surface of the first compartment;
    a second compartment disposed within the storage area, and vertically offset and adjacent to the first compartment; and
    a first channel, accessible via the slot, interconnecting the first and second compartments such that the slot feeds a receptacle defined within the second compartment, wherein the first and second compartments and the channel are configured to be removed from the storage area of the console.

4. The vehicle of claim 3, wherein the receptacle defined within the second compartment is divided into a plurality of portions.

5. The vehicle of claim 4, wherein the first channel further defines a plurality of outlets, each of the plurality of outlets being associated with one of the plurality of portions.

6. The vehicle of claim 3, wherein the first compartment further includes a second slot defined on the surface such that the second slot feeds the receptacle via the first channel.

7. The vehicle of claim 3 further comprising a second channel, accessible via a second slot defined on the surface and opposite of the first slot such that the second slot feeds the receptacle defined within the second compartment.

8. A storage arrangement for a center console of a vehicle comprising:
    a first compartment having a surface defining more than one slot, each of the slots having an associated channel; and
    a second compartment disposed vertically offset and aligned with the first compartment, wherein the second compartment defines a plurality of second receptacles, and wherein each of the associated channels is configured to feed one of the plurality of second receptacles.

9. The storage arrangement of claim 8, wherein the second compartment further includes a second surface defining a plurality of outlets associated with each of the associated channels, the plurality of outlets interconnect the plurality of second receptacles with the slots.

10. The storage arrangement of claim 9, wherein each of the slots, each of associated channels, and each of the plurality of outlets include predetermined contours.

11. The storage arrangement of claim 10, wherein each of the predetermined contours is based on a matching coin contour such that each of the matching coin contours is different from the other of the matching coin contours.

12. The storage arrangement of claim 8 further comprising a region defined on the surface of the first compartment configured to, in response to a vertical force, move vertically along an axis with respect to the second compartment.

13. The storage arrangement of claim 8, wherein the second compartment is vertically offset and defined between a bottom surface of the first compartment and a second surface of the second compartment.

14. The storage arrangement of claim 8, wherein each of the associated channels is defined between an inner surface of each of the plurality of second receptacles and a wall of the second compartment.

15. The storage arrangement of claim 8, wherein each of the plurality of second receptacles is defined with a section along an outer perimeter of the second compartment.

* * * * *